United States Patent
Elsloo (10) Patent No.: US 11,212,365 B2
(45) Date of Patent: *Dec. 28, 2021

(54) MANAGING DATA DELIVERY (71) Applicant: Comcast Cable Communications, LLC, Philadelphia, PA (US)

(72) Inventor: Jeffrey Elsloo, Centennial, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,687

(22) Filed: Apr. 30, 2020

(65) Prior Publication Data

US 2021/0014329 A1  Jan. 14, 2021

Related U.S. Application Data

(63) Continuation of application No. 14/084,021, filed on Nov. 19, 2013, now Pat. No. 10,708,386.

(51) Int. Cl.
*H04L 29/08* (2006.01)
*H04L 29/06* (2006.01)
*H04N 21/433* (2011.01)
*H04N 21/231* (2011.01)
*H04N 21/458* (2011.01)
*H04N 21/218* (2011.01)

(52) U.S. Cl.
CPC .......... *H04L 67/325* (2013.01); *H04L 65/604* (2013.01); *H04N 21/2181* (2013.01); *H04N 21/231* (2013.01); *H04N 21/4334* (2013.01); *H04N 21/4583* (2013.01)

(58) Field of Classification Search
CPC . H04L 67/325; H04L 65/604; H04N 21/2181; H04N 21/231; H04N 21/4334; H04N 21/4583
See application file for complete search history.

(56) References Cited

U.S. PATENT DOCUMENTS

| 7,904,936 B2 * | 3/2011 | Urdang | H04N 7/17318 |
| | | | 725/145 |
| 2012/0183276 A1 * | 7/2012 | Quan | H04N 21/26291 |
| | | | 386/244 |

* cited by examiner

*Primary Examiner* — Jefferey F Harold
*Assistant Examiner* — Franklin S Andramuno
(74) *Attorney, Agent, or Firm* — Ballard Spahr LLP (57) ABSTRACT

Methods and systems for managing data and/or operations on data such as content are disclosed. A method can comprise receiving data from a source, determining timing information associated with the source and automatically modifying a storage operation of data received from the source based upon the timing information.

20 Claims, 7 Drawing Sheets

MANAGING DATA DELIVERY

CROSS REFERENCE TO RELATED PATENT APPLICATION

This application claims priority to U.S. application Ser. No. 14/084,021 filed Nov. 19, 2013, herein incorporated by reference in its entirety.

BACKGROUND

Data such as content can be provided by multiple sources. Recipients of data often expect to receive the data at a scheduled time. However, certain sources of the data can habitually provide data outside the scheduled time, which may be undesirable to certain parties, such as the recipients of the data. These and other shortcomings are addressed by the present disclosure.

SUMMARY

It is to be understood that both the following summary and the following detailed description are exemplary and explanatory only and are not restrictive, as claimed. Provided are methods and systems for, in one aspect, providing and controlling provision of data, such as content delivered to one or more devices. Provided are methods and systems for, in one aspect, determining timing information (e.g., start time, record time, delivery time, end time, blackout time, content insert time, etc.) relating to one or more content items. In another aspect, timing information can be determined (e.g., calculated, estimated, predicted, etc.) to facilitate the accurate scheduling of content recordings associated with users. In one aspect, certain content providers habitually provide content outside a scheduled time (e.g., earlier or later relative to schedule time). Accordingly, delivery patterns of various content providers can be determined (e.g., heuristically) and recording start times can be adjusted based on the determined delivery patterns to account for any habitual time shift.

In an aspect, methods can comprise receiving data from a source, determining timing information associated with the source, and automatically modifying a storage operation of data received from the source based upon the timing information.

In an aspect, methods can comprise determining timing information associated with a source of data, determining a select storage operation of a plurality of storage operations based on the source of data, and automatically modifying the select storage operation based upon the timing information.

In an aspect, methods can comprise configuring a storage operation, wherein the storage operation relates to the storage of data at a first time. Timing information associated with a source of the data can be determined and the storage operation can be modified based upon the timing information.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for, in one aspect, determining timing information (e.g., start time, record time, delivery time, end time, blackout time, content insert time, etc.) relating to one or more content items. In another aspect, timing information can be determined (e.g., calculated, estimated, predicted, etc.) to facilitate the accurate scheduling of content recordings associated with users. In one aspect, certain content providers habitually provide content outside a scheduled time (e.g., earlier and/or later when compared to schedule time). Accordingly, delivery patterns of various content providers can be determined (e.g., heuristically) and recording start times can be adjusted based on the determined delivery patterns to account for any habitual time shift.

Figure 1:
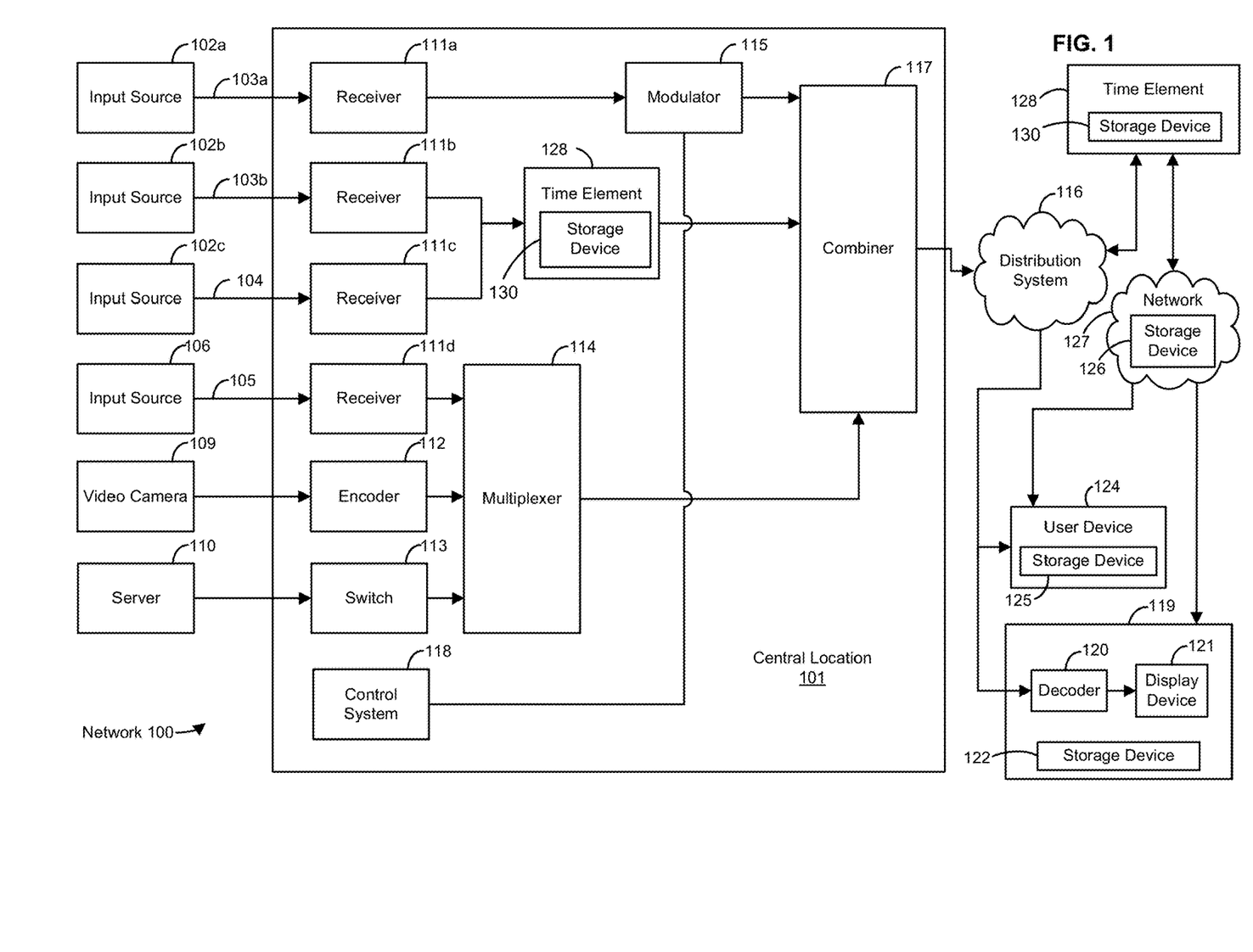
FIG. 1 is a block diagram of an exemplary network.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The network 100 can comprise a central location 101 (e.g., a headend, or processing facility), which can receive content (e.g., data, input programming) from multiple sources. The central location 101 can combine the content from the various sources and can distribute the content to user (e.g., subscriber) locations (e.g., location 119) via distribution system 116.

In an aspect, the central location 101 can be a data processing facility configured to receive content from a variety of sources 102a, 102b, 102c. The content can be transmitted from the source to the central location 101 via a variety of transmission paths, including wireless (e.g. satellite paths 103a, 103b) and terrestrial paths 104. The central location 101 can also receive content from a direct feed source 106 via a direct line 105. Content may also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders, such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, display devices 121, central locations 101, DVR's, home theater PC's, and the like. As an example, the decoder 120 can receive and process the embedded markers, flags, and signals in the content data stream for controlling a content received by the decoder 120.

In an aspect, the decoder 120 or communication terminal can comprise a storage device 122. As an example, the storage device 122 can comprise a memory or other storage medium. As a further example, a number of content assets (e.g., video, audio, etc.) can be loaded into the storage device 122 and stored for playback or processing by the associated decoder 120. However, other data, content, and/or information can be stored in the storage device 122, such as advertisements and alternative content, for example. In an aspect, the storage device 122 can be separate from the decoder 120. For example, the storage device 122 can be located upstream of the decoder 120 and downstream of the distribution system 116. As a further example, the storage device 122 can store information to be transmitted to any number of decoders 120 or other recipient devices. Accordingly, the decoder 120 can retrieve the content assets from the storage device 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be a CT, a set-top box, a television, a computer, a smartphone, a laptop, a tablet, a multimedia playback device, a portable electronic device, and the like. As an example, the user device 124 can be an Internet Protocol compatible device for receiving signals via a network, such as the Internet or some other communications network for providing content to the user. It is understood that other display devices and networks can be used. It is further understood that the user device 124 can be a widget or a virtual device for displaying content in a picture-in-picture environment, such as on the display device 121, for example. As an example, a storage device 125 can be in communication with one or more of the user device 124 and the central location 101 to send/receive content therebetween. As a further example, the storage device 125 can be located remotely from the user device 124, such as a network storage device 126.

In an aspect, a time element 128 can be in communication with one or more of the central location 101, the decoder 120, and the user device 124. The time element 128 can be software, hardware, or a combination thereof. The time element 128 can be located in one or more existing elements or it can be standalone. In another aspect, the time element 128 can be configured to receive content, such as incoming network programming or a network feed via the central location 101.

In an aspect, the time element 128 can be associated with and/or can comprise a storage device 130. As an example, the storage device 130 can comprise a memory or other storage medium. As a further example, a number of content assets (e.g., video, audio, etc.) can be loaded into the storage device 130 and stored for transmission or processing by the time element 128. However, other data, content, and/or information can be stored in the storage device 130 such as advertisements and alternative content, for example. In an aspect, the storage device 130 can be separate from the time element 128 and accessible thereby.

In an aspect, the time element 128 can be configured to determine timing information (e.g., start time, record time, delivery time, end time, blackout time, content insert time, etc.) relating to one or more content items. In another aspect, timing information can be determined (e.g., calculated, estimated, predicted, etc.) to facilitate the accurate scheduling of content recordings associated with users. In one aspect, certain content providers habitually provide content outside a scheduled time (e.g., earlier and/or later relative to schedule time). For example, if a content program is scheduled to be received at 9:00 μm EST, a first provider may delivery the content program at 9:01 μm EST on multiple occasions (e.g., daily, weekly, every other week, etc.). Such later than scheduled delivery can be discovered and adjustments can be made. As a further example, delivery patterns of various content providers can be determined (e.g., heuristically) and recording start times can be adjusted based on the determined delivery patterns to account for any habitual time shift. In an aspect, timing information can be used to extend an in-progress recording of a live event (e.g., a live sporting event, concert, political debate, etc.), for example, if the event is determined to be in progress when the scheduled end is approaching or reached.

Figure 2:
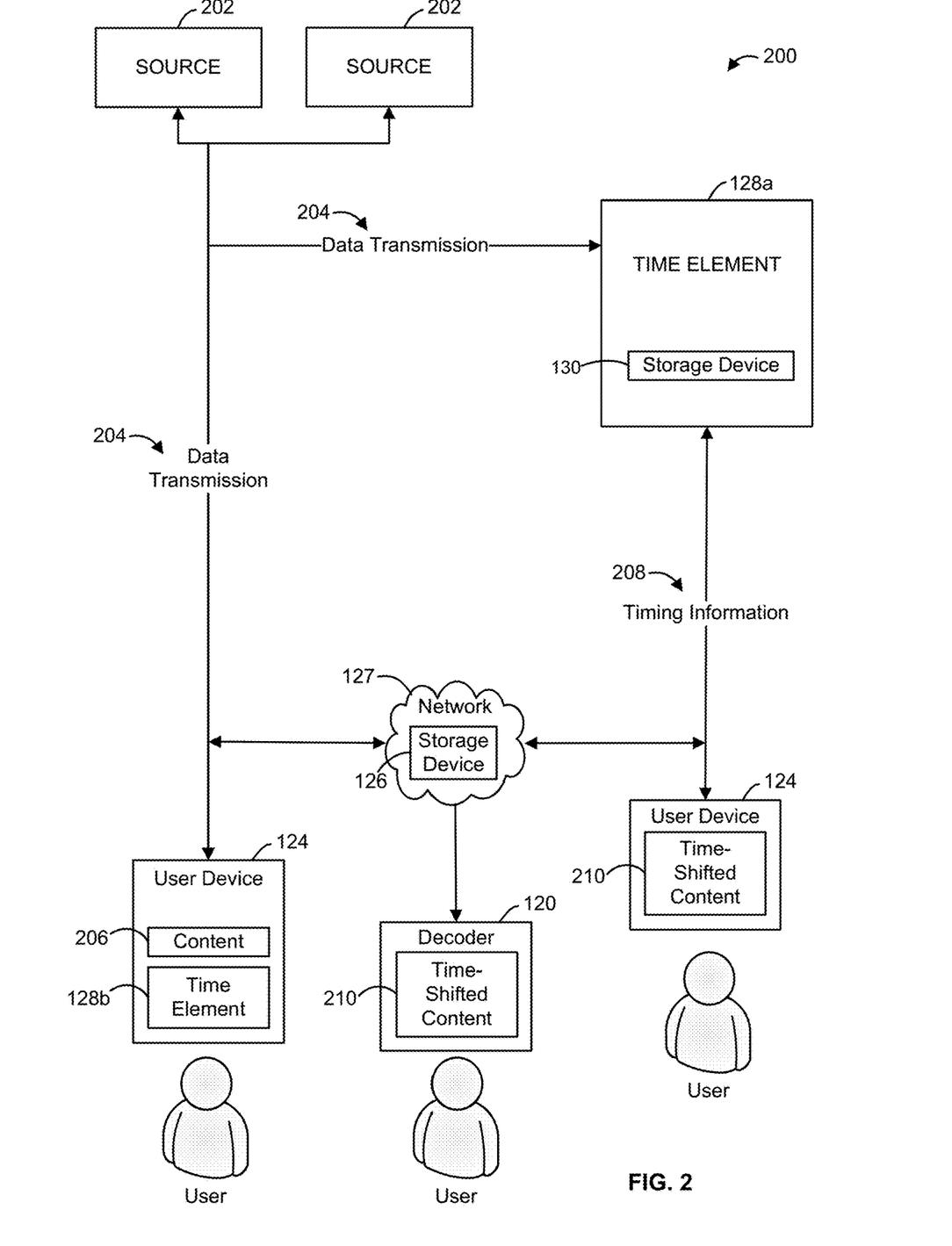
FIG. 2 is a block diagram of an exemplary system.

FIG. 2 is a block diagram of an exemplary content control system 200. The system 200 can comprise one or more data sources 202 for accessing, storing, and/or transmitting data, e.g., a transmission of file-based data. As an example, one or more of the sources 202 can be a large area (wide area), such as a national programming source, or a small area (local area), such as a local programming source (e.g., local affiliate). In an aspect, one or more of the sources 202 can comprise content delivery networks (CDN). In another aspect, the data sources 202 can comprise a content provider (e.g., provider of audio content, video content, data services, news and programming, advertisements, alternate content, etc.) configured to transmit the data (e.g., as content assets via a stream, fragments, files, etc.) to various end-users. In an aspect, one or more data sources 202 can comprise a supplemental content database. In another aspect, the supplemental content database can comprise an advertisement or alternate content database (e.g., second screen content) having a plurality of advertisements stored therein or capable of accessing advertisements stored elsewhere. As an example, the advertisement database can comprise a plurality of video advertisements, which can be interactive or other types of advertisements. As a further example, the plurality of video advertisements can each have a particular time duration associated therewith. In an aspect, the time duration associated with the advertisements, alternate, and/or supplemental content can be varied in duration. As an example, a particular advertisement can have multiple versions, wherein each version of the same advertisement can have a different time duration. Accordingly, an advertisement having a particular time duration can be retrieved to fill a time slot having a substantially equal time duration. Any item of content in sources 202 can be retrieved or transmitted to the end user.

In an aspect, one or more sources 202 can process and/or transmit data 204 to one or more network devices such as user devices 124 and/or decoders 120. As another example, a storage medium facilitates storage of at least a portion of the data 204, such as by the network storage device 126. Any portion of the data 204 can be stored locally to a receiving device (e.g., user device 124, decoder 120, etc.) or remotely from the receiving device. As a further example, the receiving device can process the data 204 to provide (e.g., present on a display) content 206 to a user. In an aspect, the content 206 that is provided based on a processing (e.g., rendering or otherwise presenting) of the data 204 can be substantially similar to content provided to other devices and users receiving and/or processing the same data 204 or copies thereof. As an example, a large area, e.g., national programming feed, can be transmitted to multiple local affiliates (e.g., servicing cities or metropolitan areas) for distribution to local devices. As a further example, the local affiliates can be equipped to control the transmission of data (e.g., data feed 204) to one or more devices associated with the local affiliate. As such, the local affiliate can provide content 206 based on one or more of the data feed 204, local programming, local advertisements, stored data, national programming, alternative programming, and the like.

In an aspect, one or more time elements 128a, 128b can be in communication with one or more of the sources 202, the decoder 120, and the user devices 124. As an example, time element 128b can be co-located and/or integrated with one or more of the sources 202, the decoder 120, and the user devices 124. One or more time elements 128a, 128b can be disposed in any location or part of any network architecture. In another aspect, the time element 128 can be configured to receive the data 204, such as incoming network programming or any data feed, via one or more sources 202. As an example, the time elements 128a, 128b can determine timing information 208 relating to the receipt and/or transmission of the data 204. As another example, a storage medium such as the storage device 130 can facilitate storage (e.g., in a buffer or more permanent storage) of at least a portion of the data 204 and/or timing information 208. In an aspect, one or more of the time elements 128a, 128b can be configured to determine timing information 208 (e.g., start time, record time, delivery time, end time, blackout time, content insert time, etc.) relating to one or more content items (e.g., data 204). In another aspect, timing information 208 can be determined (e.g., calculated, estimated, predicted, etc.) to facilitate the accurate scheduling of content recordings associated with users. In one aspect, certain content providers habitually provide content outside a scheduled time (e.g., earlier and/or later relative to schedule time). Accordingly, delivery patterns of various content providers can be determined (e.g., heuristically). Recording start times can be adjusted based on the determined delivery patterns to account for any habitual time shift.

In an aspect, timing information 208 can be transmitted to one or more of the decoder 120 and/or the user devices 124. As such, the recipient device can process the timing information 208 to provide time-shifted content 210 and/or manipulate an operation. As an example, the timing information 208 can be stored for subsequent transmission to one or more of the decoder 120 and/or the user devices 124, such as by network storage device 126. In a further aspect, a device, such as one or more of the decoder 120 and/or the user devices 124, presenting one or more of the content 206 and the time-shifted content 210 can be associated with a location identifier or classification, such as time zone, zip code, area, code, IP address, MAC address, region, class of user/device/service, a type of content, a type of receiving device, a boundary (real or defined) between two locations or any other criteria. A region can comprise a geographically defined area as a subset of a larger area. A class of user/device/service can comprise a classification of one or more users, devices, or services to distinguish the same from other users, devices, services, based on entitlements, priorities, types of payloads being delivered, or the like. A type of receiving device can comprise a make, model, serial number, processing capability, compatibility, version, addressable identifier, and the like. As an example, a device providing the content 206 can be classified with the same location identifier or classification as a device providing the time-shifted content 210. Devices providing the content 206 and/or the time-shifted content 210 can be located in any location and can be classified by any classifier or identifier.

In an aspect, timing of content delivery can vary by provider, individual content item, or latencies between the provider and storage device. For example, the master control of a content provider could choose to standardize on adding a 30 second delay to a broadcast to account for any adjustments that might need to occur before the content is broadcasted to downstream consumers. Another cause of timing variance could be that a provider's clock relative to a downstream device's clock could be offset. Another cause of timing variance could be latencies in delivery methods employed by a content provider, or in the systems used to deliver the content to the downstream storage device. Additionally, devices between the provider and the storage device (e.g., multiplexer, combiner, etc.) could introduce latency. Such variances would cause a storage operation on a downstream device to be initiated before or after the desired time, causing the content to be clipped. The method described in this disclosure would allow the storage operation to be modified such that the probability of the content being clipped is reduced or eliminated entirely.

Figure 3A:
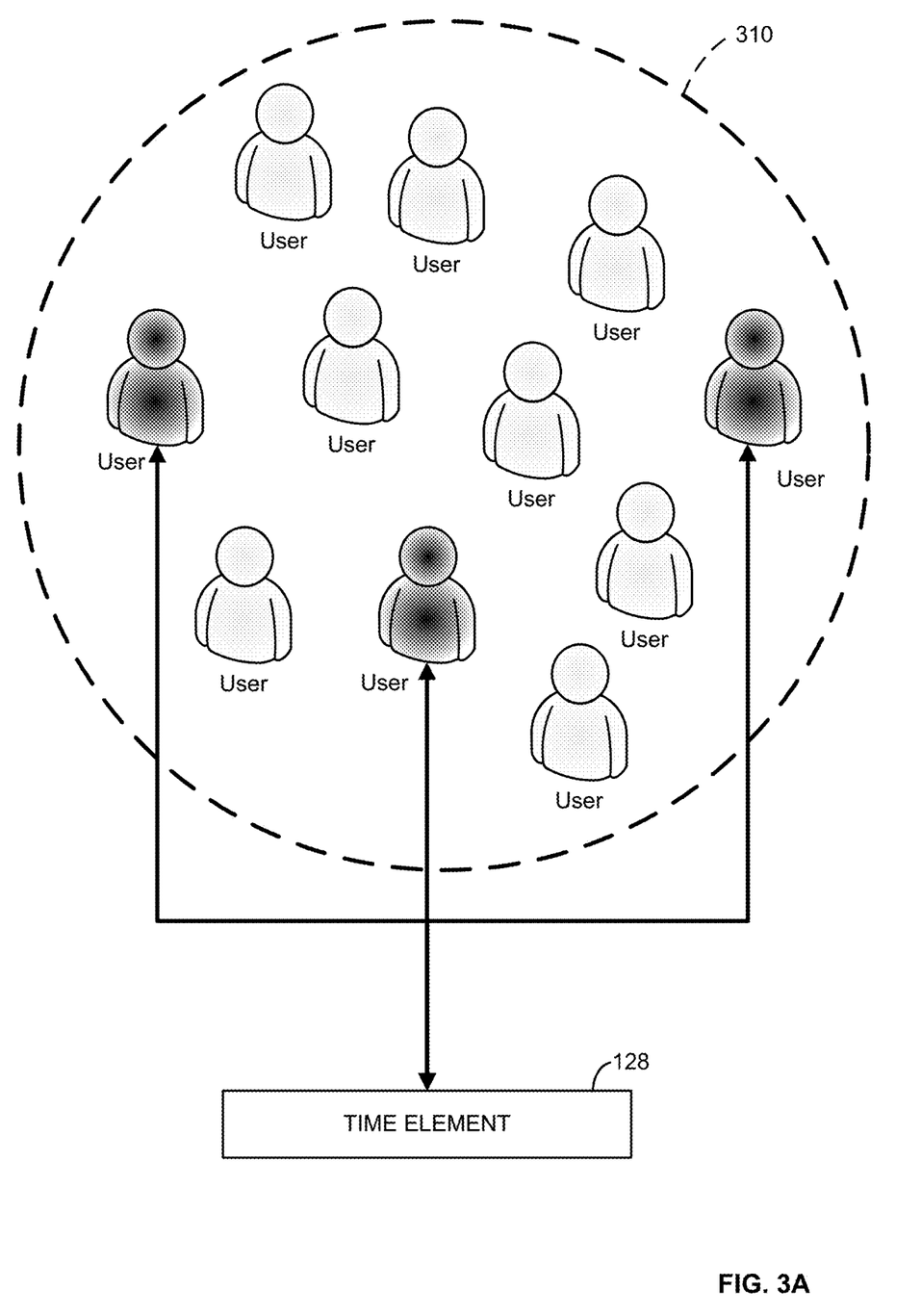
FIG. 3A is a representation of an exemplary network.
Figure 3B:
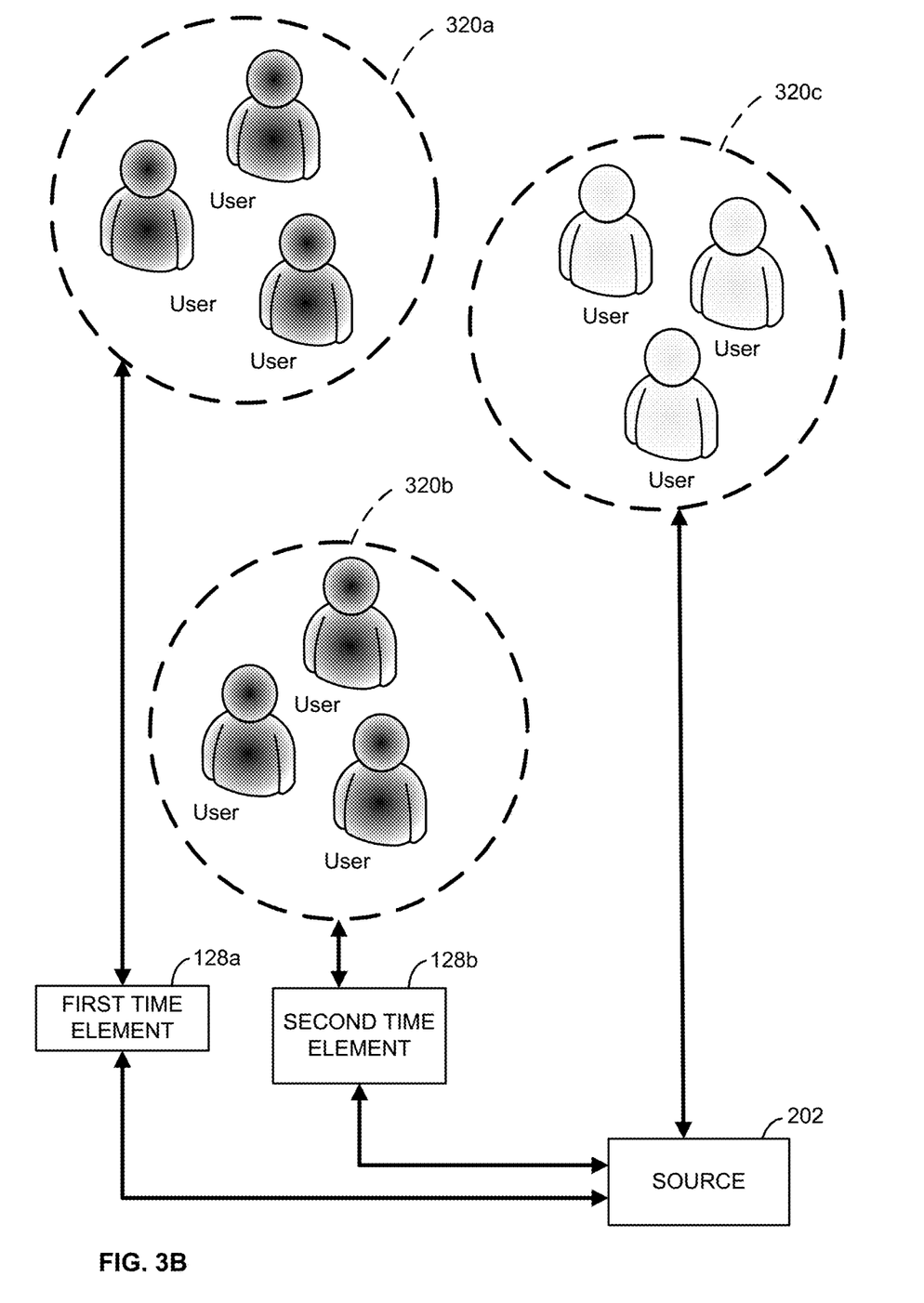
FIG. 3B is a representation of an exemplary network.

As shown in FIG. 3A, timing information can be provided to one or more (as shown), or all of the devices or users that have the same location identifier or classifier 310, such as a time zone, address, market, region, or the like. As shown in FIG. 3B, time elements 128a, 128b can be configured to selectively provide timing information to one or more devices or users (as shown). As an example, timing information can be selectively provided to one or more devices or users associated with a first identifier 320a, such as a time zone, market, region, class of service, or the like. As another example, timing information can be selectively provided to one or more devices or users associated with a second classifier 320b, such as a time zone, market, region, class of service, or the like.

Figure 4:
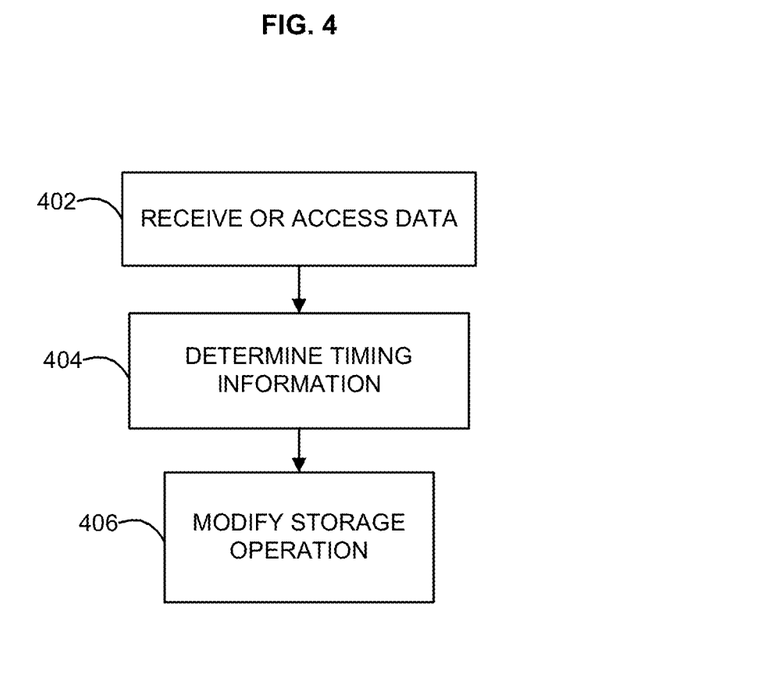
FIG. 4 is a flow chart of an exemplary method.

FIG. 4 illustrates an exemplary method for content placement. In step 402, data can be received or accessed. In an aspect, data such as one or more content items can be received from a source of content.

In step 404, timing information can be determined. In an aspect, the timing information can be associated with the data received or accessed in step 402. In another aspect, the timing information can be associated with the source of the data. As an example, the timing information can comprise relative time. In an aspect, determining timing information can comprise determining a time-dependent delivery pattern. As an example, determining timing information can comprise detecting one or more cues. As a further example, the timing information can be determined heuristically.

In an aspect, timing information can be determined (e.g., calculated, estimated, predicted, etc.) to facilitate the accurate scheduling of content recordings associated with users. In one aspect, certain content providers habitually provide content outside a scheduled time (e.g., earlier and/or later relative to schedule time). For example, a content program may be scheduled to be received (e.g., by an intermediate content provider, network DVR service, content delivery network device, user device, etc.) from a source at 9:00 μm EST. However, the source may delivery the content program at 9:01 μm EST on multiple occasions (e.g., daily, weekly, every other week, etc.), thereby resulting in a delivery pattern of later delivery. Such later than scheduled delivery can be discovered and adjustments can be made.

In step 406, a storage operation can be modified. In an aspect, the storage operation can be modified automatically. In another aspect, the storage operation can be modified based on the timing information determined. In yet another aspect, the storage operation can relate to the data received or accessed in step 402. As an example, modifying a storage operation can comprise modifying a recording start-time, recording end-time, or recording duration, or a combination thereof. As a further example, delivery patterns of various content providers can be determined (e.g., heuristically) and recording start times can be adjusted based on the determined delivery patterns to account for any habitual time shift. In an aspect, timing information can be used to extend an in-progress recording of a live event (e.g., a live sporting event, concert, political debate, etc.), for example, if the event is determined to be in progress when the scheduled end is approaching or reached.

Figure 5:
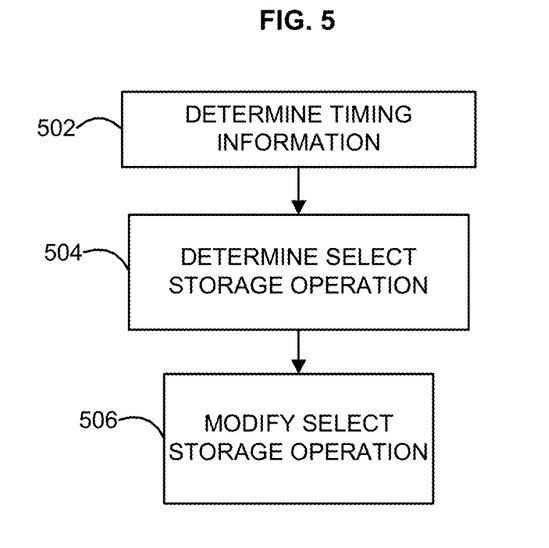
FIG. 5 is a flow chart of an exemplary method.

FIG. 5 illustrates another exemplary method for content placement. In step 502, timing information can be determined. In an aspect, the timing information can be associated with the data such as content. In another aspect, the timing information can be associated with the source of the data. As an example, the timing information can comprise relative time. In an aspect, determining timing information can comprise determining a time-dependent delivery pattern. As an example, determining timing information can comprise detecting one or more cues. As a further example, the timing information can be determined heuristically.

In an aspect, timing information can be determined (e.g., calculated, estimated, predicted, etc.) to facilitate the accurate scheduling of content recordings associated with users. In one aspect, certain content providers habitually provide content outside a scheduled time (e.g., earlier and/or later relative to schedule time). For example, a content program may be scheduled to be received (e.g., by an intermediate content provider, network DVR service, content delivery network device, user device, etc.) from a source at 9:00 μm EST. However, the recipient device may receive the content program at 8:58 μm EST on multiple occasions (e.g., daily, weekly, every other week, etc.), thereby resulting in a delivery pattern of early delivery. Such earlier than scheduled delivery can be discovered and adjustments can be made.

In step 504, a storage operation of a plurality of storage operations can be determined (e.g., selected). In an aspect, the storage operation can be determined based on the source of the data to which the storage operation is intended to be implemented. As an example, the source of data can be a content provider. In another aspect, determining a storage operation comprises selecting a storage operation that is affected by the timing information determined in step 502. As a further example, delivery patterns of various content providers can be determined (e.g., heuristically) and recording start times can be adjusted based on the determined delivery patterns to account for any habitual time shift. In an aspect, timing information can be used to extend an in-progress recording of a live event (e.g., a live sporting event, concert, political debate, etc.), for example, if the event is determined to be in progress when the scheduled end is approaching or reached.

In step 506, a storage operation can be modified. In an aspect, the storage operation can be modified automatically. In another aspect, the storage operation can be modified based on the timing information determined. In yet another aspect, the storage operation can relate to data such as content. As an example, modifying a storage operation can comprise modifying a recording start-time, recording end-time, or recording duration, or a combination thereof.

Figure 6:
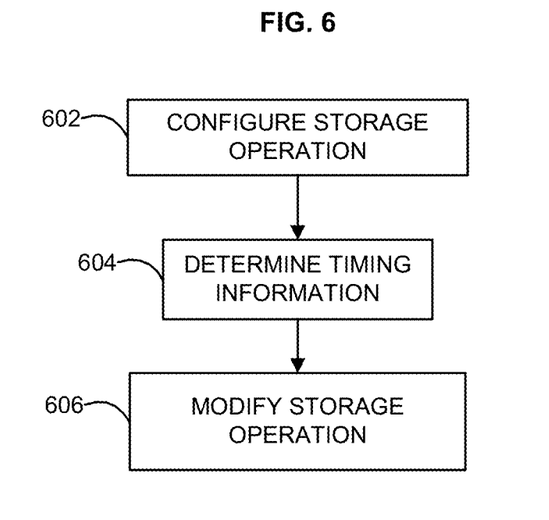
FIG. 6 is a flow chart of an exemplary method.

FIG. 6 illustrates an exemplary method for content placement. In step 602, a storage operation can be configured. In an aspect, the storage operation can relate to the storage of data at a first time. In an aspect, the storage operation can be configured based on the source of the data to which the storage operation is intended to be implemented. As an example, the source of data can be a content provider.

In step 604, timing information can be determined. In an aspect, the timing information can be associated with the data such as content. In another aspect, the timing information can be associated with the source of the data. As an example, the timing information can comprise relative time. In an aspect, determining timing information can comprise determining a time-dependent delivery pattern. As an example, determining timing information can comprise detecting one or more cues. As a further example, the timing information can be determined heuristically.

In an aspect, timing information can be determined (e.g., calculated, estimated, predicted, etc.) to facilitate the accurate scheduling of content recordings associated with users. In one aspect, certain content providers habitually provide content outside a scheduled time (e.g., earlier and/or later relative to schedule time). For example, a content program may be scheduled to be received (e.g., by an intermediate content provider, network DVR service, content delivery network device, user device, etc.) from a source at 9:00 μm EST. However, the recipient device may receive the content program at 8:55 μm EST on multiple occasions (e.g., daily, weekly, every other week, etc.), thereby resulting in a delivery pattern of early delivery. Such earlier than scheduled delivery can be discovered and adjustments can be made.

In step 606, a storage operation can be modified. In an aspect, the storage operation can be modified automatically. In another aspect, the storage operation can be modified based on the timing information determined. In yet another aspect, the storage operation can relate to data such as content. As an example, modifying a storage operation can comprise modifying a recording start-time, recording end-time, or recording duration, or a combination thereof. As a further example, modifying the storage operation can comprise configuring the storage operation to store the data at a second time. As a further example, delivery patterns of various content providers can be determined (e.g., heuristically) and recording start times can be adjusted based on the determined delivery patterns to account for any habitual time shift. In an aspect, timing information can be used to extend an in-progress recording of a live event (e.g., a live sporting event, concert, political debate, etc.), for example, if the event is determined to be in progress when the scheduled end is approaching or reached.

In an aspect, the methods and systems disclosed can utilize one or more computers to perform one or more functions in one or more locations. In an exemplary aspect, the methods and systems can be implemented on a computing system 701 as illustrated in FIG. 7 and described below.

Figure 7:
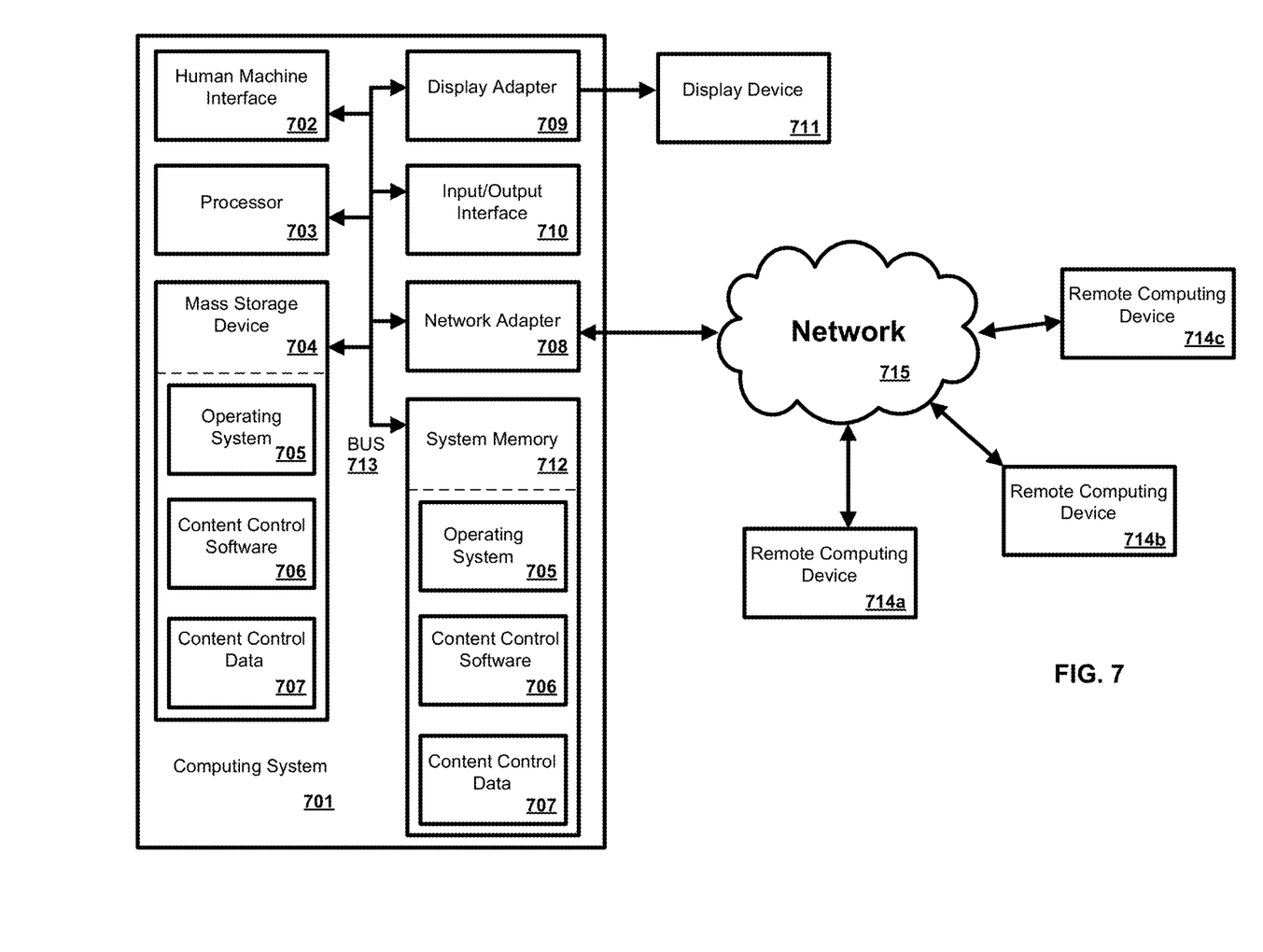
FIG. 7 is a block diagram of an exemplary computing system.

FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 701. The components of the computing system 701 can comprise, but are not limited to, one or more processors 703 or processing units, a system memory 712, and a system bus 713 that couples various system components including the one or more processors 703 to the system memory 712. In the case of multiple processors 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, content control software 706, content control data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computing system 701 typically comprises a variety of computer readable media. Exemplary readable media can be any available media that is accessible by the computing system 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as content control data 707 and/or program modules such as operating system 705 and content control software 706 that are immediately accessible to and/or are presently operated on by the one or more processors 703.

In another aspect, the computing system 701 can also comprise other removable/non-removable, volatile/non-volatile computer storage media. By way of example, FIG. 7 illustrates a mass storage device 704 that can provide non-volatile storage of computer code, computer readable instructions, data structures, program modules, and other data for the computing system 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and content control software 706. Each of the operating system 705 and content control software 706 (or some combination thereof) can comprise elements of the programming and the content control software 706. Content control data 707 can also be stored on the mass storage device 704. Content control data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 707 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing system 701 can have more than one display adapter 709 and the computing system 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing system 701 via Input/Output Interface 710. Any step and/or result of the methods can be output in any form to an output device. Such output can be any form of visual representation, including, but not limited to, textual, graphical, animation, audio, tactile, and the like. The display 711 and computing system 701 can be part of one device, or separate devices.

The computing system 701 can operate in a networked environment using logical connections to one or more remote computing devices 714*a,b,c*. By way of example, a remote computing device can be a personal computer, portable computer, smartphone, a server, a router, a network computer, a peer device or other common network node, and so on. Logical connections between the computing system 701 and a remote computing device 714*a,b,c* can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing system 701, and are executed by the data processor(s) of the computer. An implementation of content control software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, from a recipient device, a request for a storage operation for a content item from a content provider;
   determining for each content item of a plurality of content items from the content provider, a difference between a scheduled time for outputting each content item of the plurality of content items and an actual time each content item of the plurality of content items was output;
   determining, based on the difference between the scheduled time for outputting each content item of the plurality of content items and the actual time each content item of the plurality of content items was output, a time offset associated with the content provider; and sending an instruction to the recipient device configured to cause the recipient device to modify, based on the time offset associated with the content provider, a time of the storage operation.

2. The method of claim 1,
wherein the time offset associated with the content provider comprises a start time offset of a start time associated with the content provider, and
wherein the instruction to the recipient device is configured to cause the recipient device to modify a recording start time of the storage operation.

3. The method of claim 1,
wherein the time offset associated with the content provider comprises an end time offset of an end time associated with the content provider, and
wherein the instruction to the recipient device is configured to cause the recipient device to modify a recording end time of the storage operation.

4. The method of claim 1,
wherein the time offset associated with the content provider comprises an end time offset of an end time associated with the content provider, and
wherein the instruction to the recipient device is configured to cause the recipient device to modify a recording duration of the storage operation.

5. The method of claim 1, further comprising:
determining a scheduled end time for the content item; and
determining, based on the scheduled end time for the content item, that the content item will continue past the scheduled end time,
wherein the instruction to the recipient device is configured to cause the recipient device to modify a recording end time of the storage operation.

6. The method of claim 1, further comprising:
determining a scheduled duration for the content item; and
determining, based on the scheduled duration for the content item, that the content item will continue past a scheduled end time for the content item,
wherein the instruction to the recipient device is configured to cause the recipient device to modify a recording duration of the storage operation.

7. The method of claim 1, wherein determining the time offset further comprises determining a time on a content provider clock is different from a time on a recipient device clock.

8. The method of claim 1, wherein modifying the time of the storage operation comprises modifying one or more of a recording start-time, a recording end-time, or a recording duration.

9. A method comprising:
receiving, from a recipient device, a request for a storage operation for a content item from a content provider;
determining for each second content item of a plurality of second content items from the content provider, a difference between a scheduled time for receiving the second content item at one or more second recipient devices of a plurality of second recipient devices and an actual time the second content item was received by the one or more second recipient devices of the plurality of second recipient devices;
determining, based on the difference between the scheduled time for receiving each second content item of the plurality of second content items and the actual time each second content item of the plurality of second content items was received by the one or more second recipient devices of the plurality of second recipient devices, a time offset associated with the content provider; and sending an instruction to the recipient device configured to cause the recipient device to modify, based on the time offset associated with the content provider, a time of the storage operation.

10. The method of claim 9,
wherein the time offset associated with the content provider comprises a start time offset of a start time associated with the content provider, and
wherein the instruction to the recipient device is configured to cause the recipient device to modify one or more of a recording start time, a recording end time, or a recording duration of the storage operation.

11. The method of claim 9,
wherein the time offset associated with the content provider comprises an end time offset of an end time associated with the content provider, and
wherein the instruction to the recipient device is configured to cause the recipient device to modify one or more of a recording end time or a recording duration of the storage operation.

12. The method of claim 9, further comprising:
determining a scheduled end time for the content item; and
determining, based on the scheduled end time for the content item, that the content item will continue past the scheduled end time,
wherein the instruction to the recipient device is configured to cause the recipient device to modify one or more of a recording end time or a recording duration of the storage operation.

13. The method of claim 9, wherein determining the time offset further comprises determining a time on a content provider clock is different from a time on a recipient device clock.

14. The method of claim 9, wherein determining the time offset comprises one or more of determining the time offset heuristically or determining the time offset based on one or more cues.

15. An apparatus comprising:
one or more processors; and
memory storing processor-executable instructions that, when executed by the one or more processors, cause the apparatus to:
receive, from a recipient device, a request for a storage operation for a content item from a content provider;
determine, for each content item of a plurality of content items from the content provider, a difference between a scheduled time for outputting each content item of the plurality of content items and an actual time each content item of the plurality of content items was output;
determine, based on the difference between the scheduled time for outputting each content item of the plurality of content items and the actual time each content item of the plurality of content items was output, a time offset associated with the content provider; and
send an instruction to the recipient device configured to cause the recipient device to modify, based on the time offset associated with the content provider, a time of the storage operation.

16. The apparatus of claim 15,
wherein the time offset associated with the content provider comprises a start time offset of a start time associated with the content provider, and
wherein the instruction to the recipient device is configured to cause the recipient device to modify one or more of a recording start time, a recording end time, or a recording duration of the storage operation.

17. The apparatus of claim 15,
wherein the time offset associated with the content provider comprises an end time offset of an end time associated with the content provider, and
wherein the instruction to the recipient device is configured to cause the recipient device to modify one or more of a recording end time or a recording duration of the storage operation.

18. The apparatus of claim 15, wherein the processor-executable instructions, when executed by the one or more processors, further cause the apparatus to:
determine a scheduled end time for the content item; and
determine, based on the scheduled end time for the content item, that the content item will continue past the scheduled end time,
wherein the instruction to the recipient device is configured to cause the recipient device to modify one or more of a recording end time or a recording duration of the storage operation.

19. The apparatus of claim 15, wherein the processor-executable instructions that, when executed by the one or more processors, cause the apparatus to determine the time offset, further cause the apparatus to determine a time on a content provider clock is different from a time on a recipient device clock.

20. The apparatus of claim 15, wherein the processor-executable instructions that, when executed by the one or more processors, cause the apparatus to send the instruction to the recipient device and configured to cause the recipient device to modify the time of the storage operation, further cause the apparatus to send the instruction to the recipient device and configured to cause the recipient device to modify one or more of a recording start-time, a recording end-time, or a recording duration.

* * * * *